United States Patent
Rose et al.

(10) Patent No.: US 6,238,453 B1
(45) Date of Patent: May 29, 2001

(54) PRODUCING STAINLESS STEELS IN PARALLEL OPERATED VESSELS

(75) Inventors: Lutz Rose; Hartmut Vorwerk; Horst Kappes, all of Duisburg; Klaus Ulrich, Heiligenhaus, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/117,573

(22) PCT Filed: Jan. 27, 1997

(86) PCT No.: PCT/DE97/00171

§ 371 Date: Jul. 31, 1998

§ 102(e) Date: Jul. 31, 1998

(87) PCT Pub. No.: WO97/28285

PCT Pub. Date: Aug. 7, 1997

(30) Foreign Application Priority Data

Jan. 31, 1996 (DE) ............................................. 196 05 020
May 15, 1996 (DE) ............................................. 196 21 143

(51) Int. Cl.[7] ........................... C21B 13/12; C21C 7/072
(52) U.S. Cl. ................... 75/10.63; 75/10.5; 75/10.51; 75/10.48; 75/551; 75/500; 75/531; 75/543
(58) Field of Search ................... 75/10.5, 10.51, 75/10.48, 10.63, 10.64, 525, 551, 500, 531, 537, 540, 543; 266/900, 216, 225

(56) References Cited

U.S. PATENT DOCUMENTS

| | | | | |
|---|---|---|---|---|
| 3,379,815 | * | 4/1968 | Parker ................................ | 266/142 |
| 3,507,642 | * | 4/1970 | Shaw ................................. | 75/551 |
| 3,575,696 | * | 4/1971 | Rehmus .............................. | 75/382 |
| 3,746,325 | * | 7/1973 | Freeberg et al. ................... | 266/143 |
| 4,599,107 | * | 7/1986 | Masterson .......................... | 75/552 |
| 5,264,020 | * | 11/1993 | Ehle et al. .......................... | 266/142 |
| 5,520,718 | * | 5/1996 | Keilman et al. ..................... | 75/508 |
| 5,547,489 | * | 8/1996 | Inagaki et al. ..................... | 75/548 |
| 5,599,375 | * | 2/1997 | Gitman ............................... | 75/10.42 |

FOREIGN PATENT DOCUMENTS

| | | | |
|---|---|---|---|
| 0035487 | * | 9/1981 | (EP) . |
| 0116720 | * | 8/1984 | (EP) . |
| 0331751 | * | 9/1989 | (EP) . |
| 754587 | * | 10/1957 | (GB) . |

OTHER PUBLICATIONS

Steel in the USSR, vol. 19, No. 2, Feb. 1989, London, GB, pp. 61–62, XP000070901 Yu.V. Gravilenko: "Production of Stainless Steel".*

Database WPI Derwent Publications Ltd., London GB; AN 84–002177 c01 XP002035532 "Mfg Nitrogen–Containing Ultra Low Carbon Stainless Steel" & JP 58197211 A (Nippon Stainless), Nov. 16, 1983.*

* cited by examiner

Primary Examiner—Roy King
Assistant Examiner—Tima McGuthry-Banks
(74) Attorney, Agent, or Firm—Cohen, Pontani, Lieberman & Pavane

(57) ABSTRACT

A process for producing stainless steels, particularly special steels containing chromium and chromium-nickel, in a smelting arrangement having at least two vessels, for supplying a steel foundry. A charge having mostly iron-containing raw scrap materials and partially carbon-containing alloy carriers is melted in a first vessel. At a temperature of 1460° C., the melt is decarburized by the injection of oxygen so as to reduce the carbon content to less than 0.3%. The melt is heated to a tapping temperature of between 1620° C. to 1720° C. and the carbon content is subsequently reduced to 0.1%. A second charge is melted in a second vessel simultaneously with the decarburizing of the first charge in the first vessel.

10 Claims, 1 Drawing Sheet

PRODUCING STAINLESS STEELS IN PARALLEL OPERATED VESSELS

BACKGROUND OF THE INVENTION

1. Field of the Invention

The present invention is directed to a process for producing stainless steels, and particularly for producing special steels containing chromium and chromium-nickel, in a smelting arrangement having at least two vessels for supplying a steel foundry.

2. Description of the Related Art

Usually, an electric furnace of conventional construction is used in the production of chromium-containing, and chromium-nickel-containing stainless steels. The electric furnace is constructed as a D.C. or A.C. furnace in which scrap and other iron-containing metallic raw material, e.g., pig iron or DRI (Direct Reduced Iron), are melted together with an adequate amount of alloying elements or alloy carriers. The raw or base material which is melted for this purpose is tapped off into a ladle at a temperature of 1670° C. to 1700° C. The ladle is subsequently emptied into a converter wherein the melt, which contains approximately 2.5% carbon and approximately 1% silicon, is first oxidized or refined by oxygen. The carbon content is next reduced by mixtures of oxygen and nitrogen, and later by mixtures of oxygen and argon.

Depending on the application of different process techniques, decarburization is carried out to produce a final carbon content of less than 0.1%. Resulting chromium losses in the slag must then be recovered by reduction with ferrosilicon or secondary aluminum.

Further, it is known in a three-step process technique to tap off the metal from the converter at carbon contents of approximately 0.2% to 0.3% and subsequently to bring the metal to the final carbon content in a separate vacuum oxidation process.

A disadvantage that the previously known methods have in common is that decanting or readling the melt one or more times results in high temperature losses. These losses must be compensated. For by using a high tapping temperature resulting in a high amount of energy consumption in the primary melting vessel, such as the electric arc furnace. In addition to the high amount of energy consumption, the known methods disadvantageously cause increased electrode and refractory wear in the electric furnace. Furthermore installation of the converter required for the second process step requires substantially high construction heights for a surrounding building in order to accommodate a blowing lance and exhaust gas system.

SUMMARY OF THE INVENTION

It is an object of the present invention to provide a process for the production of stainless steels having fewer process steps and lower energy consumption in the individual process steps than in the known art. A further object is to provide operating equipment that can be constructed at a lower height.

The process of the present invention begins by melting, in a first vessel, a first charge having mostly iron-containing raw scrap materials and partially carbon-containing alloy carriers. At a temperature of 1460° C., the melt is decarburized by the injection of oxygen, such as by blowing, so as to reduce the carbon content to less than 0.3%. Next the melt is heated to a tapping temperature of between 1620° C. to 1720° C. The carbon content is then reduced to 0.1%. The process of melting a second charge in a second vessel is accomplished simultaneously with the decarburizing of the first charge in the first vessel.

The process according to the present invention is carried out in a smelting device having at least two vessels being operated in parallel. Either electrodes for melting the charge, or blowing lances for top-blowing and/or blowing in oxygen and oxygen mixtures can be used. The vessels thus serve initially as smelting units and then as refining units. This has the advantage that the melt can be processed and brought to a desired temperature without experiencing temperature losses caused by decanting. Scrap, ferronickel, nickel, ferrochromium and other metallic iron-containing raw materials are melted in each of the vessels at different times, preferably by electrical energy. This results in a base metal containing mostly iron and having a chromium and nickel content close to the final analysis of the steel quality to be produced, particularly as austenites, ferrites and martensites.

In an advantageous embodiment of the present invention, when using high carbon-containing and/or high silicon-containing ferrochromium, oxygen is blown in by a lance so that the silicon content is reduced. After a melt temperature of 1500° C. to 1600° C. is reached, in the same vessel, the electrode arm is swiveled out. An oxygen lance is swiveled in, which together with nozzles located in a bottom in a side wall of the vessel, oxidizes the melt with oxygen. Of course, mixtures of oxygen and nitrogen, argon, hydrocarbon, and steam can also be used to oxidize the melt. For an average blowing period of 20 to 40 minutes, and at an oxygen injection rate of 0.1 to 2.0 $Nm^3/t \times min.$, for the oxygen lance and the injection nozzles, the melt is decarburized to a final carbon content of 0.10% to 0.015%.

The amount of heat liberated by the blowing process can be utilized to add coolant, as for example, Ni, FeNi, ferrochromium, scrap and other iron-containing metallic raw materials such as pig iron masses, DRI or alloying agents, in order to adjust the target analysis and target temperature.

After blowing, the slag is reduced by reducing agents such as ferrosilicon, aluminum or secondary aluminum with the addition of slag developers such as lime and fluorspar for recovering oxidized chromium. The produced steel and/or the slag are/is tapped off. The vessel is again filled with scrap and alloy carriers, the electrodes are swiveled in, and the scrap and alloy carriers are melted by the electrodes.

The smelting process can and the subsequent blowing process run successively in each of the respective vessels of synchronously between the vessels. After 80 to 120 minutes, a melt can be prepared from one vessel, or in the case of synchronous production of both vessels, a melt is prepared every 40 to 60 minutes for further-processing, in a continuous casting plant.

The simultaneous use of two vessels not only has the advantage, of continuously supplying a continuously casting plant, but is also advantageous with respect to energy. After the smelting in the first vessel, for example, the-still hot-electrodes drawn out of the first vessel can then be introduced into the second vessel to begin the smelting therein. This process reduces energy consumption and electrode loss.

The blowing process is carried out to the lowest carbon content which naturally leads to high stress of the refractory material in the vessel hearth or bottom. Therefore, the blowing process, in an advantageous embodiment of the present invention, is terminated when a carbon content of 0.2% to 0.4% is reached. In this embodiment, metal and slag are emptied together into a ladle. The slag is removed by decanting and by scraping. The ladle with the metal melt is then transferred into a vacuum vessel, as is known, so that by blowing oxygen the metal melt is refined to a final carbon content.

Utilizing this process, the typically elaborate installation of a converter for the blowing process is not necessary particularly in the preferred embodiments of the present invention, so that investment costs for the process can be decisively reduced. Furthermore, there is no energy-consuming decanting of the base metal which has been melted by electrical energy, especially from the transporting ladle into the converter, in order to refine the carbon content by using oxygen.

For a particularly high degree of oxidation of silicon, another preferred embodiment of the present invention adds that oxygen during the smelting of the charge. A door lance is used in this embodiment so as to avoid special construction steps.

An example of the invention is shown in the accompanying drawing.

DETAILED DESCRIPTION OF THE PRESENTLY PREFERRED EMBODIMENTS

Figure 1:
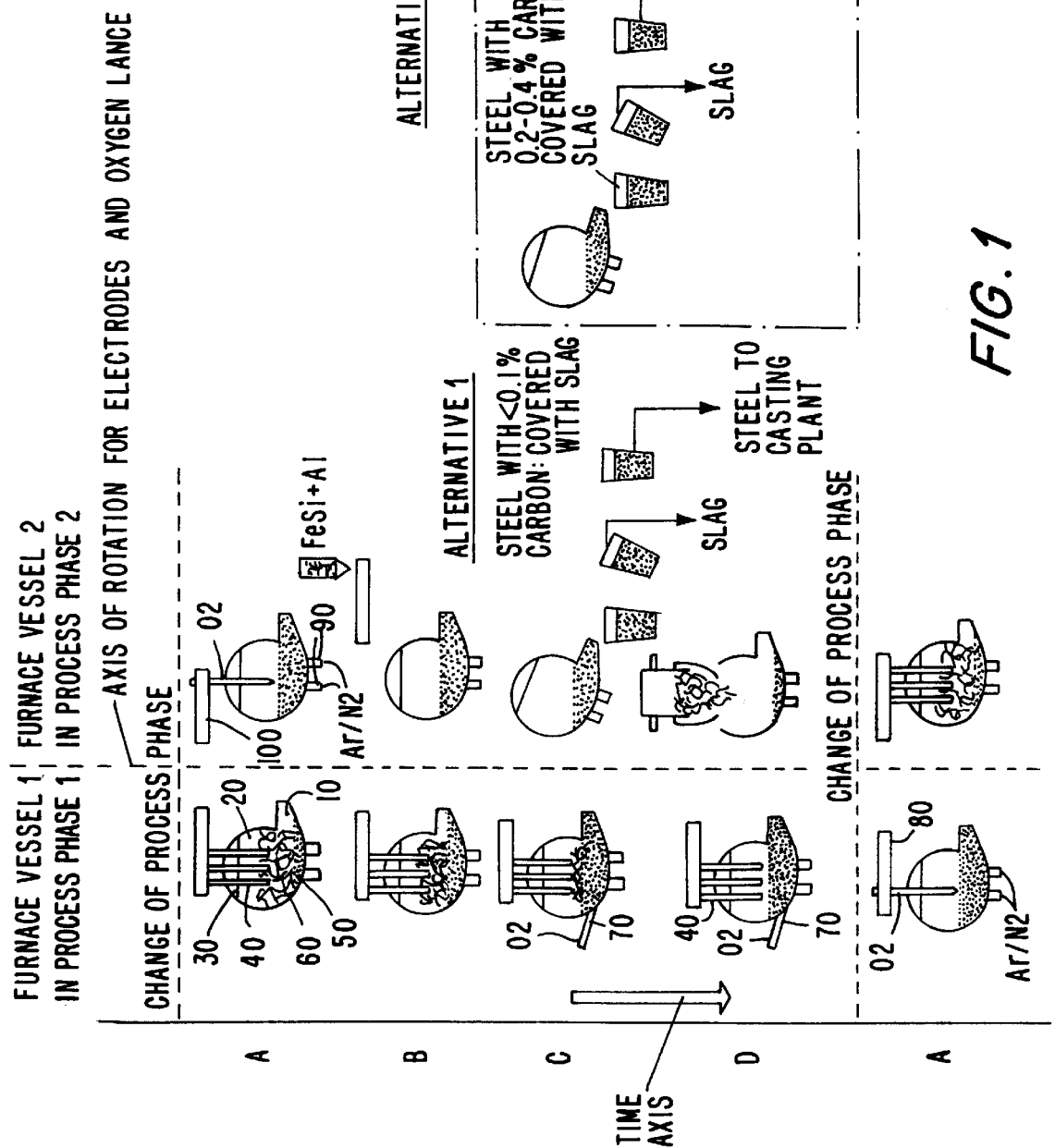
FIG. 1 shows a diagram of the individual process steps.

First, considering process phase 1, when furnace vessel 1 is at step A, there is a small liquid pool 50 in the furnace vessel 1 on which a newly poured charge 60 is located. The furnace vessel 1 is closed by means of a cover 30 through which electrodes 40 project into the upper vessel 20 of the furnace 1. In step B, the charge 60 is melted by electrical energy provided by the electrodes 40. In so doing, the liquid bath level 50 rises in the lower vessel 10 of the furnace 1. In step C, the charge 60 comprising essentially scrap, ferronickel, nickel, ferrochromium and other iron-containing metallic materials, is melted virtually completely to liquid base metal 50. When using high carbon-containing and/or high silicon-containing alloying means, oxygen can be blown in by means of a first lance 70, so that the silicon content is reduced.

In step D, the base material is completely melted, and the melt has a temperature of 1500° C. to 1600° C. In vessel 1, the electrode device 40 is removed from the vessel 1 and a second oxygen lance 80 is swiveled in for changing to process phase 2. In the present diagram, process phase 2 is shown in furnace vessel 2 because this process phase runs in vessel 2 at the same time as process phase 1 runs in furnace vessel 1 (and vice versa).

Now turning to the process phase 2, in step A, the melt is oxidized with a lance 100 and with bottom nozzles 90 or side nozzles, wherein oxygen or an oxygen mixture is used. The bottom nozzles 90 or side nozzles 90 are concentric nozzles 90, having an outer tube, an annular clearance, and a central tube. Oxygen, or an oxygen mixture comprising $O_2+N_2$, $O_2+Ar$, or $O_2+air$, is introduced through the central tube. $N_2$ or Ar or hydrocarbon or steam or a mixture of these gasses is blown in through the annular clearance at the same time.

In step B, after the final carbon content is reached at a tapping temperature of 1620° C. to 1680° C., the melt slag is reduced by a reducing agent such as ferrosilicon or aluminum in order to recover oxidized chromium. The metal and slag are then tapped together.

In step C, the melt can be decarburized to a final carbon content of 0.05%, as shown in alternative 1, or, as shown in alternative 2, transferred after separation of the slag to a vacuum installation at a carbon content of 0.2 to 0.4% and brought to the desired final carbon content therein. A finished steel is then tapped.

In step D, furnace 2 is filled with a new charge of scrap and partially with alloy carriers containing carbon, wherein a liquid pool can be located in the furnace vessel 2.

As was indicated above, the process is then repeated, beginning with Step A.

What is claimed is:

1. A process for smelting and refining stainless steel in a smelting arrangement having electrodes and at least two vessels for supplying a steel foundry, comprising the steps of:

a) melting using electrodes, in a first vessel, a first charge substantially including at least one of solid and liquid metallic iron-containing raw materials, and partially including carbon-containing alloy carriers, so as to produce a melt covered with slag;

b) decarburizing the melt after reaching a temperature of 1460° C., to a carbon content of less than 0.3% by injecting one of oxygen and oxygen mixtures;

c) heating the melt to a tapping temperature of 1620° C. to 1720° C.;

d) subsequently bringing the melt to a final carbon content of less than 0.1%, steps a)–d) being carried out in the first vessel; and e) melting a second charge in a second vessel during the decarburizing of the first charge in the first vessel by pivoting the electrodes from the first vessel to the second vessel, and repeating steps b) through d) in the second vessel whereby all the process steps for smelting and refining are carried out respectively in each of the vessels so that the vessels function in a parallel, staggered fashion.

2. The process according to claim 1, further comprising reducing substantially all melt slag by a reducing agent, and subsequently tapping the reduced melt slag together with the metal, after the final carbon content and tapping temperature are reached.

3. The process according to claim 2, wherein the reducing agent is one of ferrosilicon, silicon and aluminum.

4. The process according to claim 1, wherein the decarburizing step includes injecting one of oxygen and oxygen mixtures by top-blowing in combination with at least one of bottom blowing and side blowing.

5. The process according to claim 1, wherein the decarburizing step includes decarburizing the melt to a final carbon content of up to 0.05%, for an oxygen injection period of 20 to 40 minutes.

6. The process according to claim 1, further comprising, terminating the oxygen injecting at a carbon content of approximately 0.2% to 0.3% and a temperature of approximately 1650° C., reducing slag with one of ferrosilicon and aluminum, emptying the metal and the slag together into a ladle, removing the slag by decanting and by scraping off, and bringing the metal in the ladle to a desired final carbon content of less than 0.1%.

7. The process according to claim 1, wherein step e) includes vacuum degassing the melt to a desired final carbon content of less than 0.1%.

8. The process according to claim 1, wherein the melting steps include melting the charge by means of electrical energy.

9. The process according to claim 2, further comprising, adding oxygen during the melting step so as to cause oxidation of any amount of silicon that may be present.

10. The process according to claim 9, wherein the oxygen is added through a door lance.

* * * * *